Figure 1:
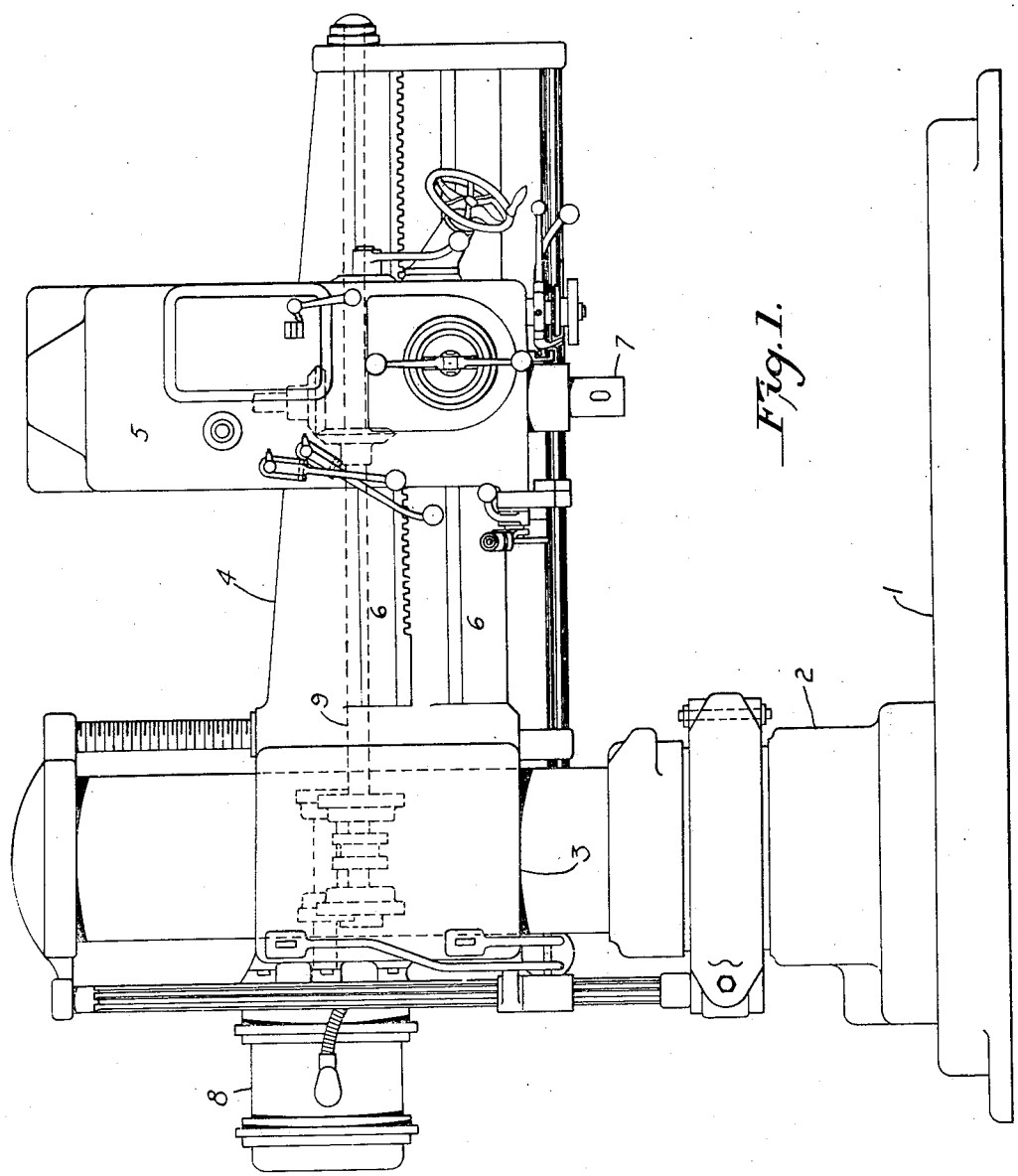

March 12, 1935.  D. C. KLAUSMEYER ET AL  1,993,742
SINGLE LEVER FEED CONTROL
Filed July 31, 1931   3 Sheets-Sheet 1

Inventors
DAVID C. KLAUSMEYER
DECEASED
By H. HENRY SUNDERMANN
EXECUTOR
AUGUSTUS M. SOSA
Attorney
Nathan, Bowman & Helfrich March 12, 1935. D. C. KLAUSMEYER ET AL 1,993,742
SINGLE LEVER FEED CONTROL
Filed July 31, 1931  3 Sheets-Sheet 3
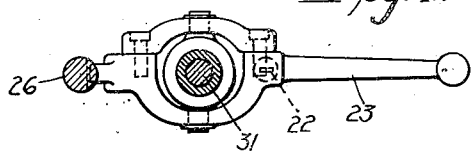
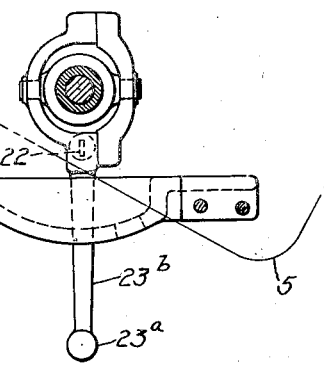
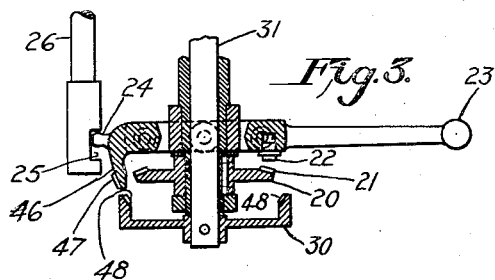
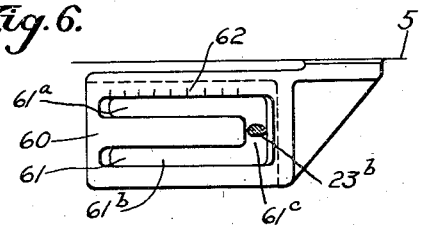
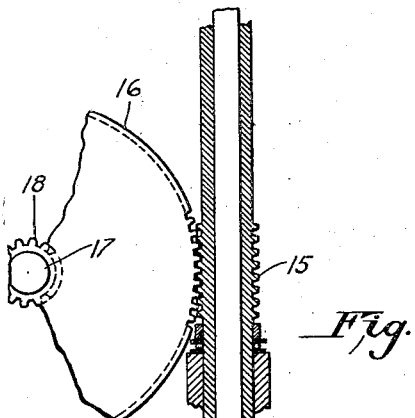
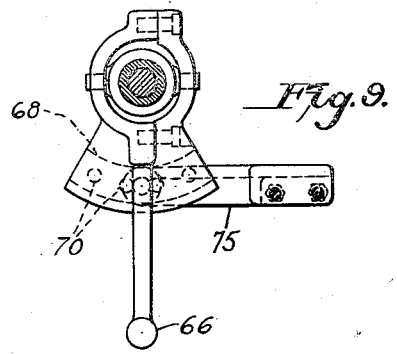
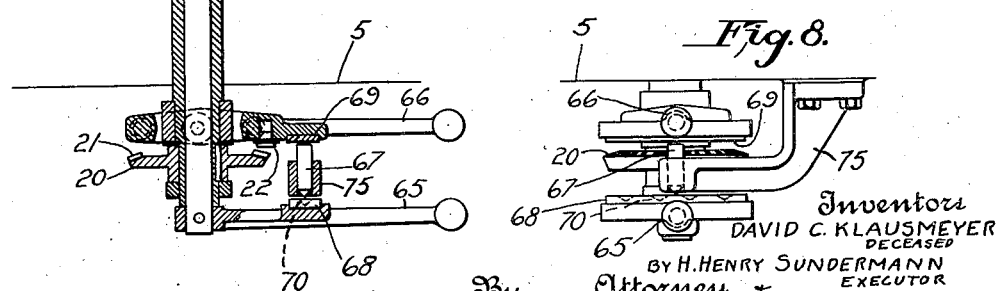
Inventors
DAVID C. KLAUSMEYER
DECEASED
BY H. HENRY SUNDERMANN
EXECUTOR
AUGUSTUS M. SOSA
Attorney
Nathan, Bowman & Helferich

UNITED STATES PATENT OFFICE 1,993,742

SINGLE LEVER FEED CONTROL

David C. Klausmeyer, deceased, late of Cincinnati, Ohio, by H. Henry Sundermann, executor, Cincinnati, Ohio, and Augustus M. Sosa, Cincinnati, Ohio, assignors to The Cincinnati Bickford Tool Company, Cincinnati, Ohio, a corporation of Ohio Application July 31, 1931, Serial No. 554,288

8 Claims. (Cl. 77—32)

This invention relates to drilling machines and it is more particularly concerned with improved means for regulating and controlling the movements of the drill spindle. It has for its main object to provide controlling devices for both manual and power feeds arranged in a manner whereby the manual means is interlocked with the power means so that either may be actuated independently of the other but not simultaneously.

A further object of this invention is to provide a mechanism for controlling movements of a machine element in such a manner that during power movements thereof the manual means is ineffective and remains stationary. Another object of this invention is to construct a control device for disconnecting automatically the power driving means when the manual drive is effected and conversely and also to arrange the parts so that if desired a single controller element may be employed for controlling the action of a multi-speed power transmission as well as providing the interlocking means between the power and manual drive. Still another object of this invention is to provide a controller for the spindle of a drilling machine so arranged that the power feed therefor may be disconnected at any time without upsetting or shifting the feed change gears of the power drive from a preselected position, and to render the manual drive means effective for translating the spindle. At the completion of the manual movement the controller is adapted to be returned to its normal position and the power drive again thrown in at the rate previously selected.

Ordinarily a machine tool such as a drilling machine is provided with numerous controls for accomplishing the above enumerated functions and by reducing the number of control levers and hand wheels to one or two elements, suitably interlocked, the chances of confusion arising by the operator grasping the wrong lever are materially reduced. Thus, by providing a single lever interlocked in the manner whereby it is impossible to actuate or accomplish two opposed movements of the spindle simultaneously, a more safe and efficiently operated machine is produced.

For constructural reasons it is necessary to locate the hand wheel of the manual traverse means for the spindle adjacent the spindle, and as a consequence the diameter of the wheel is relatively small requiring the application of a goodly amount of energy on the part of the operator to translate the spindle, the shorter the lever arm the greater is the force required to effect feed movements of the spindle by hand. Inasmuch as it is impracticable to enlarge the hand wheel so as to provide ample leverage this invention proposes to provide manual feeding means in the form of a lever, of ample length, having a declutchable toothed engagement with a cooperating member carried by the spindle feed shaft. With this arrangement the lever may be brought into engagement with a portion of the feed shaft member and moved horizontally a fraction of a revolution thus imparting a given movement to the feed shaft and spindle, and then released. By retracting the lever and repeating the operation of the tool spindle may be fed into the work by hand as great a distance as may be required, or reversed as the case may be, with the expenditure of a minimum amount of effort. When the required movement has been effected, the power feed is thrown in, or the controller is moved out of the way to provide sufficient room for the operator in changing the work-piece, tool, etc.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings, like characters of reference denote corresponding parts throughout all the views, of which:—

Figure 2:
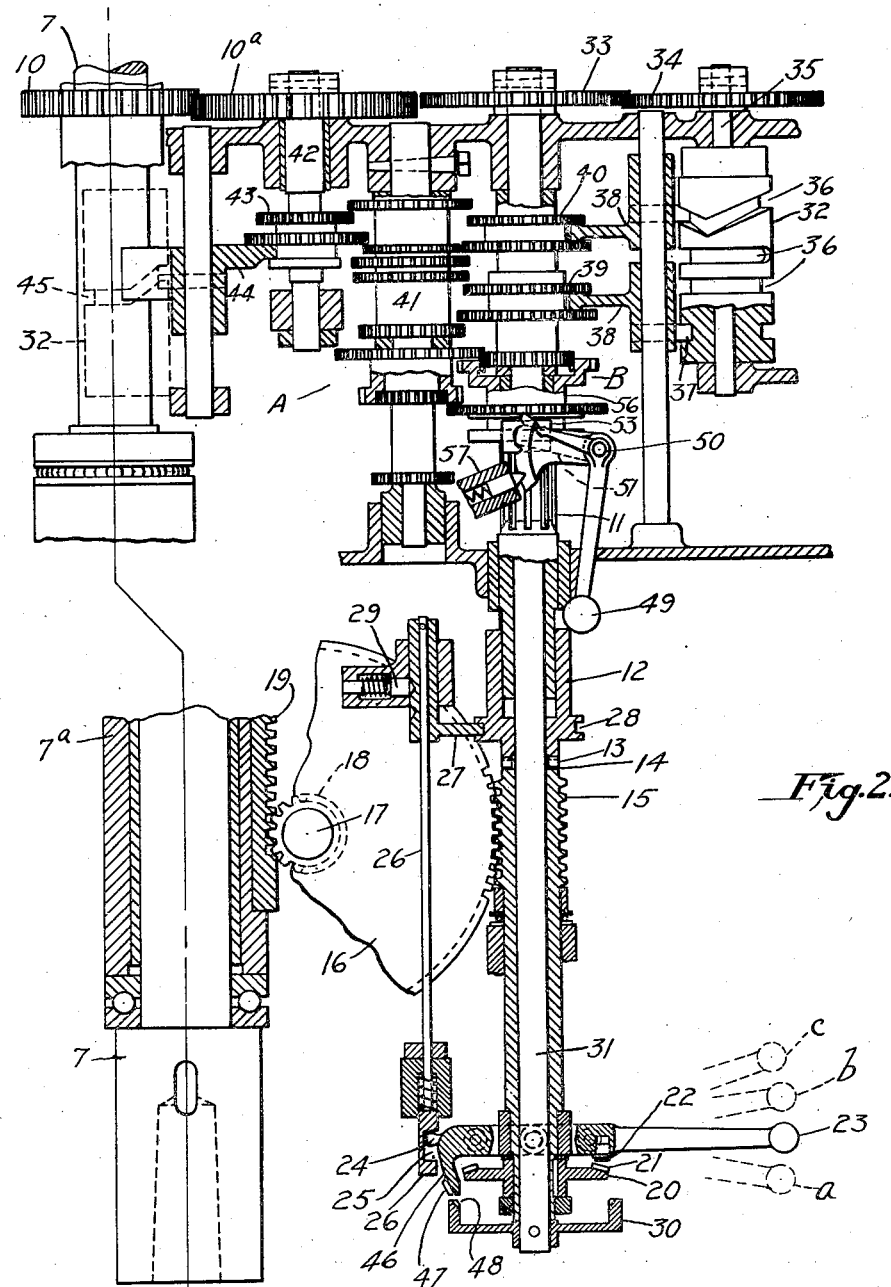

Figure 1 is an elevational view of a drilling machine incorporating this invention. Fig. 2 is a developed sectional view of certain portions of the spindle driving transmission and more particularly the spindle translating mechanism. Fig. 3 is a sectional view of the controller and portions of its associated mechanism. Fig. 4 is a plan view thereof. Figs. 5 and 6 are details of a form of control means, which is guided in its movements. Figs. 7, 8 and 9 are details of a modified form of control means in which two interlocked levers are employed.

Referring to Fgure 1 the machine, in general, comprises a base 1, and a column 2, on which is rotatably mounted a sleeve member 3 that supports a translatable drill arm 4. A drill head indicated generally as 5 is supported on the guideways 6 of the arm and is translated therealong in a well known manner. The conventional spindle 7 is translatably and rotatably mounted in the head and receives driving power from motor 8 through an arm shaft 9 and suitable change gears journaled in the head. Power from the arm shaft 9 enters the head at the rear thereof, as shown in dotted lines of Fig. 1, and is thence transmitted through conventional speed change gears (not shown) to the spindle. Power feed for the spindle, in this disclosure, is taken preferably directly from the spindle 7 by means of a gear 10 splined thereto which transmits power in a series of change gears indicated generally as A to a tubular feed shaft 11. The lower end of this shaft has splined thereto a clutch element 12 provided with clutch teeth 13 adapted to be meshed with clutch teeth 14 provided by the feed worm 15. The worm wheel 16 transmits power from the worm 15, through shaft 17 and pinion 18, to a rack 19 provided by the spindle sleeve 7ª. It will be understood, of course, that the sleeve 7ª is translatable in the head 5 but non-rotatable and provides bearings for the rotatable spindle 7.

The lower end of the feed shaft has secured thereto a toothed wheel 20, the teeth 21 of which are adapted to be engaged by a tooth 22 carried by a control lever 23 and when the teeth are engaged and the controller 23 turned, the worm 15 is likewise turned, thereby imparting translatory movements to the spindle. One of the concepts of this invention is to provide a control lever which may be conveniently positioned by the operator in order to obtain full advantage of his strength in any position which he may be obliged to assume by reason of the peculiarities of the tooling operation or the shape or size of the work-piece. By providing a feed control element in the form of a pivotal lever having a toothed connection with the feed mechanism, a simple and highly effective manual feed device is obtained and one which may be actuated from any position that the operator may desire.

In conjunction with the manual feeding mechanism just described, means are provided for interrupting and discontinuing the power feed whenever the operator moves the controller 23 to impart manual movements to the spindle. Figs. 2 and 3 illustrate one form of such a device for accomplishing this purpose in which it will be seen that the control lever 23 is also provided with a tooth 24 which is adapted to move in the slot 25 formed in a feed clutch shifter bar 26. The upper end of the bar 26 carries a shifting fork 27 which encircles a groove 28 formed in the feed clutch sleeve 12. The connection 24—25 is preferably diametrically opposite the tooth connection 21—22. Thus when lever 23 is depressed to position $a$, shown in dotted lines in Fig. 2, the manual feed means is engaged and the rod 26 elevated and the power feed clutch teeth 13 and 14 disengaged. A conventional spring detent device 29 is provided for mantaining the clutch element 12 in its operative or inoperative position. If the lever 23 is then oscillated, a feeding movement of the spindle takes place. The slight amount of movement required to disengage the manual feed clutch elements 22 and 21 for resetting the lever 23 does not again re-engage the power feed clutch elements 13 and 14 because of the lost motion provided by the slot 25 in shifter bar. In order to re-engage the power feed, the controller 23 must be moved past its neutral position to the position $b$ indicated in dotted lines in Fig. 2. The initial part of this movement causes the tooth 24 to take up the play provided in the slot 25 and the final movement of the lever then moves the bar 26, shifting fork 27, and clutch element 12 downwardly, thereby to engage the clutch teeth 13 and 14. When the power feed clutch is engaged, the worm 15 is rotated and likewise the toothed wheel 20, but inasmuch as the lever 23 is disconnected from the said wheel 20 it remains stationary and no damage will be done or harm come to the operator by reason of the turning of the feed wheel 23.

A further refinement of this invention is to provide a means for effecting variations in the power feed by the same element that controls the selection between power and manual feeds. To this end there is provided a second toothed wheel 30 mounted on the lower end of shaft 31. The upper end of the shaft 31 is suitably connected to a clutch shifting cam drum 32 by means of gears 33 and 34, the latter of which is secured to a shaft 35 on which the cam drum 32 is mounted. The drum 32 is provided with one or more cam grooves 36 which guide pins 37 provided by gear shifter forks 38. The forks 38 encircle suitable grooves formed in sliding gear units 39 and 40, each of which may be made up of one or more gears of various sizes according to the number of speed changes desired. As here shown, each of the gear units 39 and 40 are provided with two gears which are adapted to be selectively meshed with the gears formed on the gear unit 41. The gear unit 41 is driven from the spindle 7, as heretofore explained, through the gears 10 and 10ª. Feed gear 10ª is secured to a short shaft 42 on which is slidably mounted a gear unit 43 which is adapted to be selectively engaged with mating gears formed on the unit 41. This change speed mechanism provides two additional feed changes, but it is obvious that more or less may be employed as desired. Shifting of the gear unit 43 is accomplished by means of shifter fork 44 similar to those previously described which also tracks a groove 45 formed in the cam drum 32. It will be understood, however, that the cam grooves formed in the drum 32 are formed with high and low portions cyclically arranged in order to effect the proper shifting of the gear units for a given angular movement of the drum to give a predetermined rate of feed. Shifting of the gear units above described is accomplished by means of the master control lever 23 which in addition to the tongue 24 and dog tooth 22 has an offset portion 46 provided with serrations or teeth 47 which are adapted to be brought into engagement with teeth 48 formed on the cam wheel 30. With the lever in the position $c$, shown in dotted lines in Fig. 2, movement of the lever 23 in the horizontal plane rotates the feed index wheel 30, shaft 31, gears 33 and 34 at cam drum 32 in either direction according to the direction of swing of the controller 23. In order to effect a change in the power feed gear settings without causing the spindle 7 to be moved axially while passing through the various speed changes, control lever 23 is first depressed to the position $a$ and then returned to its intermediate position $b$. The first of these movements, it will be seen, disconnects the power feed clutch 12, while the second movement of the lever re-engages the latter with teeth of the index wheel 30. The parts are now arranged so that the controller may be moved laterally to any desired position which will effect any repositioning of the change-speed feed gear units to bring about a pre-selected feed rate. The controller 23 after re-positioning the gear units, may then be moved to position b which re-engages the power feed clutch 12 with the feed worm 15 and the spindle is accordingly translated by power.

As is customary with machine tools providing a large number of speeds or feeds, indicia plates and pointers are provided, in order that the operator can tell at a glance just where to position the controlling elements in order to effect a given rate of speed or feed. Similarly with this arrangement, an indicia plate or pointer may be carried by the wheel 30 for cooperation with a pointer or indicia plate carried by the relatively stationary part of the machine. The foregoing gear trains provide what may be termed the finer feed changes and there is also provided additional speed change gear sets B which provide what may be termed the back gears or change gears producing the coarser changes in the spindle feed. The shifting of the back gears may be effected by the cam drum 32 if desired, but as herein shown they are preferably shifted by a separate control lever 49 pivoted on the drill head within convenient reach of the operator. The back gear controlling lever 49 is secured to a shaft 50 on which is also mounted a shifter fork 51 that engages a shifter spool 53 formed integral with one of the back gear units 56. Suitable locking means in the form of detent mechanism 57 retain the shifter and hence the gear unit 56 in an adjusted position.

The back gears in this disclosure provide two major changes which cooperate with the eight finer feed changes previously referred to, to produce a total of 24 separate power feed rates for the spindle 7, all of which is more fully explained in the patents to D. C. Klausmeyer, Nos. 1,686,240 and 1,686,383. Reference to these patents may be had if further particulars are desired in respect to the arrangement of the gears and particular feeds obtainable.

Figs. 5 and 6 illustrate an alternative form of single lever control in which the power feed clutch shifting pin 24 has been omitted from the lever 23ª, its function being replaced by a slotted bracket member 60. The arm 23ᵇ of the control lever extedes through a U-shaped opening 61 formed therein which acts as a guide for determining the sequence of movements of the control lever. When the lever is in the upper slot 61ª, the portion 47 thereof (see Figs. 2 and 3) is in engagement with the teeth of the feed index wheel 30, and if the lever is then moved angularly the cam drum 32, and the gear shifters actuated thereby, may be moved to effect any given spindle feed desired, the bracket 60 being graduated or marked as at 62 to indicate the various feeds.

When the lever 23ª is moved to the right end of the upper slot thereby also bringing the feed change gears to an intermediate or neutral position, and then dropped through the connecting slot 61ᶜ, the toothed connection 47—48 is broken and the toothed connection 21—22 is made between the lever and the feed wheel 30. Movement of the lever laterally in the lower slot 61ᵇ, it will be seen, advances or retracts the spindle according to the direction of movement of the lever when in engagment with the feed wheel 30. The upper and lower walls of the slot are formed sufficiently apart to permit disengagement of the dog 22 from the wheel 30 at any point therein so as to permit repeated oscillatory movements of the lever thereby to effect as great a feed manually as may be needed. At the completion of the manual feed movements the lever may again be moved to a preselected position in the upper slot and the power feed once more becomes effective.

A further alternative is the construction illustrated in Figs. 7, 8 and 9 of the drawings. In these figures two levers are illustrated, the lever 65 controlling the positioning of the feed change gears hereinbefore described, and the lever 66 providing the means for translating the spindle manually. So that the operator will not throw in a power feed while the manual feed lever is in engagement with the feed wheel 20, interlocking means are provided in the form of a sliding pin 67, which prevents engagement of the dog tooth 21 with the teeth of the feed wheel 20 whenever the lever 65 is in a position to effect a power feed. The lower end of the pin 67 is provided with a taper and normally rests upon the upper surface of an arcuate plate 68 carried by the gear shifting control lever 65. The upper end of the pin engages the face of a similar plate 69 carried by the feed lever 66, thereby providing a fixed abutment preventing engagement of teeth 21 and 22 whenever the pin rests upon the upper surface of plate 68. The pin 67 is held in a definite position by means of a bracket 75 secured to the drill head.

A series of indentations 70 are provided in the gear shifting lever plate 68 at positions, relative to the pin 67, that correspond with the neutral position of the sliding gears of the feed works. As one or more of the sliding gear sets pass from one effective position to another it passes through a neutral or idle zone whereby the power drive to the spindle is suspended. The detents 70 are so located with respect to the pin 67 that when the feed gears are in neutral, one of the detents is directly under the pin and the latter drops thereinto a distance sufficient to permit engagement of the dog tooth 22 of the feed lever with the teeth of the feed wheel 20.

The lever 66 may then be oscillated thereby to effect feed movements of the spindle. It will be noted, however, that the manual feed means is effective only when the feed gear control lever has previously placed the sliding gears in a neutral position and as soon as the lever 65 is moved out of a neutral zone the pin 67 is cammed out of the recess and elevated thereby declutching the hand lever 66 from the feed wheel. In this way there is provided a positive interlock between the two mechanisms whereby either may be actuated independently but not simultaneously.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A machine tool combining a translatable element; power means for translating said element including a sleeve member; clutch means between said sleeve and said power means; manually operable means including a control lever provided with an abutment rotatively pivoted to said sleeve member; a notched member fixed to said sleeve member adjacent said control lever, the abutment on said lever being adapted to engage a notch on said fixed member when said lever is moved in one direction and to turn said fixed member and sleeve when said lever is moved in another direction; and means actuated by said control lever for rendering said power means ineffective to translate said element when said control lever is moved to a position to effect translation of said element manually.

2. A drilling machine combining a translatable spindle; a multi-speed power feed transmission for said spindle; rate changing means for said transmission; a power feed clutch interposed between said transmission and said spindle adapted when effective to transmit the movements of the power transmission to said spindle; manual means for translating said spindle comprising a single lever operatively connected with said feed clutch and rate changing means; means actuated by said lever when shifted to one position to impart translatory movements to said spindle and to effect disengagement of said power feed clutch; means actuated by said lever when shifted to said position to render said rate changing means inoperative; means actuated by said lever when shifted to another position to render said rate changing means operative and said power feed clutch and said manual translating means inoperative; and means actuated by said lever when shifted to a third position to render said power feed clutch effective and said rate changing and manual translating means ineffective.

3. A machine tool combining a translatable spindle; a cam controlled multi-speed feed transmission for said spindle; means for actuating said cam thereby to change the speed of the transmission comprising a control lever; means rotated by manual actuation of said lever for imparting feed movements to said spindle, said lever having at least two effective positions and being available selectively to actuate said cam control mechanism or to impart movements to said spindle; and means interlocking said manual feed means and said cam actuating means adapted to render the other of said means ineffective when either of said means is rendered effective by the said lever.

4. A drilling machine combining a drill spindle; a multi-speed power transmission for feeding said spindle; speed change mechanism for said transmission; manual means for actuating said speed change mechanism thereby to effect movement of said spindle at any one of a plurality of predetermined rates by power, and for imparting feed movements to said spindle manually, including a single lever adapted, when actuated to vary the speed of the power transmission, to be ineffective to impart feed movements to said spindle manually, said lever being pivoted to a rotatable support and laterally movable in either of two spaced paths, and operative connections between said lever and said speed change mechanism when said lever is in one of said paths, and connections between said lever and said spindle when said lever is in the other of said paths; and means automatically disconnecting the lever from the respective connections upon the movement of the lever out of the respective paths.

5. A drilling machine combining a translatable spindle; a multi-speed power feed train of gears including speed change mechanism and a terminal gear element for imparting power feed movements to said spindle; a clutch mechanism interposed in said train ahead of said gear element adapted, when effective, to impart the movements of said feed train to said spindle by power; manually operable means including a lever for selectively varying the rate of power feed, for actuating said clutch, and for manually actuating said terminal gear element thereby to impart either manual or power feed movements to said spindle; means controlled by said lever, operative to render said clutch ineffective whenever the lever is operated to impart feed movements to the spindle; and means rendering the lever ineffective to feed the spindle and ineffective to render said clutch effective when said lever is in position to vary the speed of the power transmission.

6. A machine tool combining a translatable spindle; single means including a rack and pinion for translating said spindle; selectively operable power and manual drives for translating said spindle; speed change means for varying the rate of said power drive; gear means common to said manual and power drives for actuating said pinion; a pair of clutches for selectively connecting either said power drive or said manual drive with said gear means, said manual drive including a lever mounted for oscillatory movements in two different paths and in another path transverse to said two paths; means actuated by movement of said lever in said transverse path for successively disconnecting the power drive clutch and connecting the manual drive clutch; means actuated by movement of said lever in one of said first mentioned paths for actuating said manual drive; and means actuated by said lever when moved in another of said first mentioned paths for actuating said speed change mechanism.

7. A machine tool combining a translatable member; single means including a rack and pinion for translating said member; selectively operable variable speed power and manual drives, including gear means common to both drives, for rotating said pinion; a pair of clutches for selectively connecting either said power drive or said manual drive with said gear means, said manual drive including a manually actuable element movable in transverse paths; means actuated by movement of said element in one path successively to actuate said clutch to disconnect said power drive from said gear, and to position the element selectively in either of two intermediate positions or in a fourth position to connect said manual drive therewith; and means actuated by a transverse movement of said element in said transverse paths selectively to rotate said gear means thereby to effect manual translation of said member or to effect a change in the speed of said variable speed power drive.

8. A device of the character described combining a translatable member; single means to translate said member; variable speed power means including a clutch mechanism and a rotatable driven element for actuating said translating means by power; speed change means for said power means; manually operable means for controlling said clutch for actuating said speed change means, and for rotating said element to effect manual actuation of said translating means, said manually operable means including a single lever operatively connectible with said speed change mechanism, with said clutch mechanism and with said rotatable driven element; and means, actuated by said lever when it is actuated to render said power means effective, to disconnect said lever from said rotatable driven element and from said speed change mechanism.

H. HENRY SUNDERMANN,
*Executor of the Last Will and Testament of David C. Klausmeyer, Deceased.*
AUGUSTUS M. SOSA.